[11] 3,545,545

| [72] | Inventor | Joseph C. Allen |
| | | Bellaire, Texas |
| [21] | Appl. No. | 786,790 |
| [22] | Filed | Sept. 26, 1968 |
| [45] | Patented | Dec. 8, 1970 |
| [73] | Assignee | Texaco, Inc. |
| | | New York, New York |
| | | a corporation of Delaware |

[54] METHOD FOR RECOVERY OF HYDROCARBONS FROM A SUBTERRANEAN FORMATION PREVIOUSLY PRODUCED BY SOLUTION GAS DRIVE
3 Claims, No Drawings

| [52] | U.S. Cl. | 166/273 |
| [51] | Int. Cl. | E21b 43/20 |
| [50] | Field of Search | 166/273 |

[56] References Cited
UNITED STATES PATENTS

| 3,044,544 | 7/1962 | Holbrook et al. | 166/273 |
| 3,084,743 | 4/1963 | West et al. | 166/273 |
| 3,227,210 | 1/1966 | Trantham | 166/273X |
| 3,344,857 | 10/1967 | Gilchrist | 166/273 |
| 3,386,506 | 6/1968 | Quance | 166/273 |

OTHER REFERENCES

Uren, Lester C. Petroleum Production Engineering Oil Field Exploitation. N.Y., McGraw-Hill, 3D. Ed., 1953. pp. 54-57, 64, 65. (Copy in group 350)

*Primary Examiner*—Marvin A. Champion
*Assistant Examiner*—Ian A. Calvert
*Attorneys*—K. E. Kavanagh and Thomas H. Whaley ABSTRACT: In a subterranean hydrocarbon-bearing formation which previously has undergone a solution gas drive, improved recovery of hydrocarbons is effected by repressuring the formation by the injection of a gas, followed by water injection, followed by injection of carbon dioxide, followed by a water flood.

3,545,545

METHOD FOR RECOVERY OF HYDROCARBONS FROM A SUBTERRANEAN FORMATION PREVIOUSLY PRODUCED BY SOLUTION GAS DRIVE

FIELD OF THE INVENTION

This invention relates to an improved method for the recovery of hydrocarbons from a subterranean hydrocarbon-bearing formation which previously has undergone a solution gas drive, by repressuring the formation by the injection of a gas followed by water injection at the pressure of the formation, followed by injection of carbon dioxide, followed by a water flood.

DESCRIPTION OF THE PRIOR ART

Primary production of hydrocarbons from a subterranean hydrocarbon-bearing formation is normally obtained by allowing the energy of the formation contained therein to drive the hydrocarbons from the formation to the surface through one or more production wells. The energy of the formation may exist in the form of water drive, gas cap, or solution gas drive or combinations thereof. These various forms of energy provide the driving force necessary for the production of hydrocarbons from subterranean hydrocarbon-bearing formations without the necessity of providing energy from an external source.

However, the primary energy of a subterranean hydrocarbon-bearing formation generally becomes depleted long before all of the hydrocarbons in place have been recovered. Consequently, it is common practice to apply secondary recovery techniques to recover additional hydrocarbons. These secondary methods for adding energy to the formation from outside sources commonly utilize the injection of water, gas, or miscible fluids, or combinations thereof, which serve to displace additional hydrocarbons within the formation toward production wells from where they can be produced.

Since most subterranean formations are composed of porous rocks in which the pore spaces vary in size and which are interconnected by capillary openings which also vary in diameter, the extent of recovery by both primary and secondary methods of the fluids contained therein is dependent to a large degree upon the retentive forces of capillarity and viscosity which are present. The interfacial tension between phases such as oil-water and gas-oil exhibits a retentive force for holding the oil in place. Displacement of the oil by injection of extraneous fluids as water or gas is inefficient due to the lower viscosity of the displacing fluids. For example, the effectiveness of water flooding is dependent largely upon the interfacial tensions between the immiscible fluids which seriously reduce the efficiency of the water flood by causing a high degree of entrapment due to capillary pressures within the pores of the reservoir formation. In addition, the aqueous fluid tends to bypass or finger through the hydrocarbons and leave a significant amount unrecovered within the reservoir, because of lower viscosity of the water.

In order to reduce boundary retentive forces, various modifications have been undertaken, such as using wetting agents, to reduce the interfacial tension between the residual oil and the surface area of the reservoir rock to which it adheres.

Another secondary recovery process which is used and which reduces the boundary retentive forces is that of a miscible drive whereby there is introduced into the formation a fluid which is miscible with the formation hydrocarbons. The effectiveness of the method is due to the removal or partial removal of the interface between the displaced and the displacing fluids thereby eliminating the retentive forces of capillarity.

In order to reduce the cost of a miscible flood, a slug may be used followed by injection of a cheaper scavenging fluid such as water. The requisite size of the slug is a major economic factor and depends on the phase behavior of the fluids.

One form of miscibility which enhances oil recovery is the use of carbon dioxide. Since the carbon dioxide is soluble in both the oil and water, the carbon dioxide tends to partition into the oil phase. This partitioning reduces the interfacial forces and thereby reduces the forces of capillarity.

Other secondary processes may involve gas or air drives and generally consist of pressure restoration methods wherein gas is forced into the formation to restore the pressure of the formation; pressure maintenance, which is the above process applied before the pressure of the formation is depleted; and air drive where the gas is forced into the formation through an injection well while simultaneously producing from production wells.

While the above mentioned techniques aid substantially in the recovery of hydrocarbons, viscosity differences and formation heterogeneities materially affect the processes. For example, the size and variations of the porous interstices will affect displacement practices so that when fluids are injected into these areas, they will follow generally paths of high permeability and porosity, leaving behind large amounts of hydrocarbons which are unrecoverable.

It is an object, therefore, of the present invention to improve recovery of hydrocarbons from subterranean formations by a method wherein a stepwise procedure is applied, combining the beneficial effects of an immiscible displacement of hydrocarbons in the minor pore spaces leaving behind an immiscible trapped gas saturation and a miscible displacement of the hydrocarbon in the major pore channels.

SUMMARY

This invention describes an improved recovery method consisting of a solution gas drive, followed by gas injection with accompanying formation pressure increase, followed by a partial water flood, followed by carbon dioxide injection, followed by a water flood.

DESCRIPTION OF THE INVENTION

In the concurrently filed copending, coassigned application for U. S. Pat., Ser. No. 786,792, filed Sept. 30, 1968, for A Method for Recovery of Hydrocarbons From Subterranean Hydrocarbon-Bearing Formations, there is disclosed a method for the improved recovery of hydrocarbons from a formation which previously had undergone solution gas drive. As disclosed therein, it was found that improved recovery could be realized by the injection of a gas to maintain a free gas saturation at the expected pressure level of the water injection prior to conducting a water flood operation, which then is conducted at the newly established pressure level of the formation.

It has been determined now that if the water injection step is continued until a water phase is established between the hydrocarbon phases which exist in the major and minor pore channels, additional recovery can be obtained thereafter by the undertaking of a miscible displacement.

The benefits to be realized from this method will become apparent from the following description of the invention. It is postulated that the injection of a gas with an accompanying pressure increase results in dissolution of the previously liberated gas. With a gas with limited solubility, the pressure increase results also in flow of the injected gas into the minor pore channels due to the fact that the flowing pressure gradient across the minor capillary pressure channels is greater than the capillary displacement pressure.

Thereafter, water is injected into the formation, in amounts sufficient to establish a water barrier between the hydrocarbon phases which exist in the minor and the major pore channels.

Following the injection of water to form the barrier, carbon dioxide is injected as a slug. The carbon dioxide would flow through the major flow channels and displace some of the hydrocarbon. The benefits of the previous water injection are now apparent in that there is a water-separating phase between the major and minor pore channels, thus preventing the carbon dioxide migration into the minor channels.

Following the step of carbon dioxide injection, a water flood is undertaken to effectuate a miscible flood of the hydrocarbon in the major pore channels.

Thus is described a method for the improved recovery of hydrocarbons by means of a stepwise procedure combining the benefits of an immiscible displacement of hydrocarbons from minor pore channels followed by a miscible displacement of hydrocarbons from the major pore channels.

Other modifications and variations of the invention are hereinbefore set forth may be made without departing from the spirit and scope thereof, and therefore only such limitations should be imposed as are indicated in the appended claims.

I claim:

1. In a method for recovering hydrocarbons from a subterranean hydrocarbon-bearing formation whereinto an injection well and a production well penetrated having major and minor pore channels containing hydrocarbons by water flooding, said formation having been produced previously by solution gas drive and subsequently repressured by injecting gas until a pressure as great as the expected water flood pressure is established, the improvement comprising:
    a. injecting an aqueous medium into said formation through said injection well until an aqueous phase barrier is established between said major and minor pore channels;
    b. injecting a miscible slug into said formation via said injection well;
    c. injecting an aqueous medium into said formation via said injection well to displace said miscible slug throughout said formation and hydrocarbons toward said production well; and
    d. recovering hydrocarbons via said production well.

2. The method defined in claim 1 wherein said miscible slug is carbon dioxide.

3. The method defined in claim 1 wherein said aqueous medium is selected from the group consisting of water, brine and carbonated water.